Aug. 23, 1927.

G. H. LANG 1,640,197

SPEED INDICATOR

Filed Feb. 14, 1925

Inventor.
George H. Lang.
by Heard Smith & Tennant.
Attys

Aug. 23, 1927.
G. H. LANG
SPEED INDICATOR
Filed Feb. 14, 1925
1,640,197
2 Sheets-Sheet 2
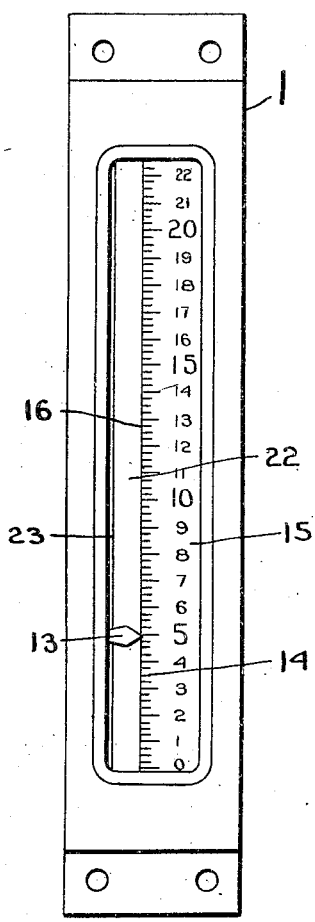
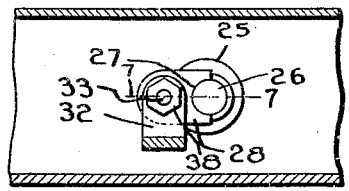
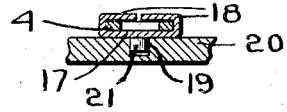
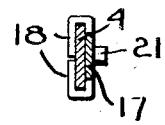
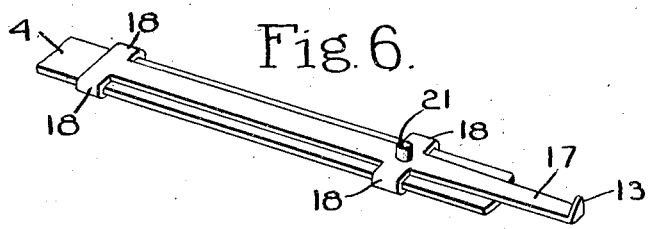
Inventor.
George H. Lang.
by Heard Smith & Tennant.
Attys.

Patented Aug. 23, 1927.

1,640,197

UNITED STATES PATENT OFFICE.

GEORGE H. LANG, OF BOSTON, MASSACHUSETTS, ASSIGNOR TO STOVER-LANG COMPANY, OF BOSTON, MASSACHUSETTS, A CORPORATION OF MASSACHUSETTS.

SPEED INDICATOR.

Application filed February 14, 1925. Serial No. 9,315.

This invention relates to speed indicators and the like and particularly to indicators of that type in which the graduated portion of the dial extends in a straight line and in which the indicator has a straight-line movement parallel to the straight-line graduated portion of the dial.

One of the objects of the invention is to provide an improved straight-line movement for the indicator or index member.

Another object of the invention is to provide an improved construction wherein the dial is situated closely adjacent the glass front of the indicator casing and in which the indicator operates directly back of the dial. This construction has the advantage that it brings the dial close to the front of the casing where it is readily visible from a variety of different angles.

Still other objects of the present invention are to provide an improved form of indicator which is specially designed to be operated with a flexible shaft and otherwise to improve indicators of this class all as will be more fully hereinafter set forth.

In order to give an understanding of the invention I have illustrated in the drawings a selected embodiment thereof which will now be described after which the novel features will be pointed out in the appended claims.

Fig. 2 is a front view thereof;

Fig. 3 is a section on the line 3—3, Fig. 1;

Fig. 4 is an enlarged section on the line 4—4, Fig. 1;

Fig. 5 is an enlarged section on the line 5—5, Fig. 1;

Fig. 6 is a fragmentary perspective view of the indicating arm showing the opposite side from that shown in Fig. 1:

Figure 1:
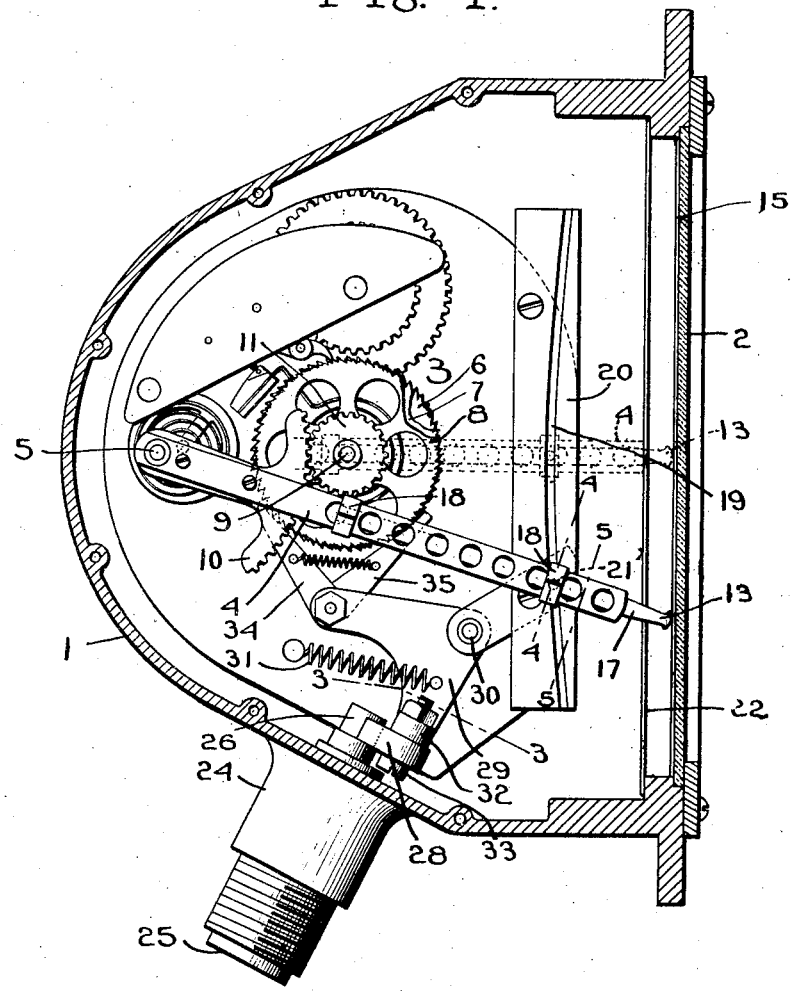
Fig. 1 is a side view of the indicator with the casing shown in section to better illustrate the operative parts.

In the drawings 1 indicates a casing in which the operative parts of the speed indicator are enclosed and which is provided with an opening in its front face that is closed by a glass plate 2. The operative parts of the speed indicator are indicated generally at 3 and they include an indicating arm 4 which is pivoted at 5 and which is adapted to swing about the pivot into different angular positions. The means for controlling the position of the arm 4 is such that when the indicator is operating said arm will assume an angular position which is dependent upon the speed of the machine with which the speed indicator is used, said arm 4 having a position toward the lower limit of its movement when the machine is operating at a low speed and moving upwardly as the speed increases.

The operative mechanism 3 of the speed indicator may have various constructions without in any way affecting the present invention and merely as illustrating one appropriate construction I have shown in the drawing an operative mechanism which is in many respects similar to that shown in my Patents No. 1,128,695, February 16, 1915, and No. 1,204,459, November 14, 1916. The devices of these patents include a driving member which is driven at a speed proportionate to the speed of the machine with which the instrument is used, a positioning member which is actuated by the driving member, and an indicating member which is periodically positioned by the positioning member.

In the present embodiment the driving member is indicated at 6, the positioning member at 7 and the indicating member at 8, all three of these being mounted coaxially and the positioning member and indicating member being mounted to rotate upon the stud 9. The driving member is rotated at a speed proportionate to the speed of the machine with which the device is used, the positioning member is actuated by the driving member and the indicating member 8 is periodically positioned by the positioning member so that the position of the indicating member indicates at all times the speed of the machine.

In the present embodiment the indication is secured through the medium of the indicating arm 4, the latter having rigid therewith a segmental gear 10 which meshes with a gear 11 that is rigid with the indicating member 8. By this construction the turning movement of the indicating member 8 is translated into a swinging movement of the arm 4 and the arm 4 will always have a position corresponding to that of the indicating member.

At the end of the indicating arm is an indicating portion or index member 13 which co-operates with a graduated scale 14 formed on a dial member 15. This dial member is situated immediately behind the glass plate 2 and, if desired, it may be secured to the glass by means of a suitable adhesive. The dial extends only part way across the glass as shown clearly in Fig. 2, the edge of the dial being indicated at 16.

The indicating member or index member 13 is situated at one side of the dial 15 and is visible through the portion of the glass which is uncovered by the dial, this being the portion between the line 16 in Fig. 2 and the left hand edge of the glass.

The dial is flat and the line of graduations 14 extends in a straight line thus making a straight-line dial.

One of the features of the present invention relates to a novel means for giving the index member 13 a straight-line movement parallel to the straight-line graduations as the indicating arm 4 swings about its pivot 5. This is provided for herein by making the arm 4 extensible and contractible and arranging the index member 13 on the extensible portion and by further providing means whereby as the arm 4 is swung about its pivot it will be extended or contracted in such a way as to maintain the right line movement of the index member 13.

The index member 13 is mounted on an arm section 17 which has a telescopic relation with the main portion of the arm 4. This is herein provided for by making the section 17 with ears 18 which embrace the edges of the main arm 4. The section 17 can thus slide back and forth on the main portion 4 but is always maintained in line therewith.

The straight-line movement of the index member 13 is secured by means of a track or guiding groove 19 which is formed in a guiding member 20 that is rigidly secured to the casing 1 and in which is received a pin or projection 21 extending from the member 17. This track 19 is so curved and shaped that it will cause a retracting movement of the member 17 when the arm 8 swings toward the central position and an extending movement when the arm swings away from the central position. The curvature of the track 19 is such that as the arm 4 swings about its pivot 5 the index member 13 will travel in a straight line and thus have a straight-line movement. Said track 19 is further so positioned that the index member 13 is situated closely behind the glass 2 and the dial 15 so that when looked at from the front the index and dial appear as shown in Fig. 2.

22 indicates a plate situated back of the dial and secured to the casing and which closes the portion of the opening that is not closed by the dial with the exception of a narrow slit or space 23 along the left hand edge of the opening and through which the arm 17 extends. The index member 13 is thus situated in front of the plate 22 and behind the dial 15, said index member being preferably as close to the dial as is convenient without causing any interference.

The screen or plate 22 thus screens the operative parts of the mechanism 3 from view and hence the only parts which are visible through the sight opening are the dial and the index member.

In an instrument of this type the opening through which the index member is visible is comparatively narrow but by having the dial member situated immediately behind the glass which is at the front of the opening and by having the index member 13 travelling in a straight line as close to the dial member as is feasible an instrument is provided in which both the dial and the index member can be as readily seen from an angle as from directly in front.

Another feature of the invention relates to the means for operating the driving member 6. The casing is provided with a neck 24 in which is rotatably mounted a shaft section 25 that is adapted to be coupled to a flexible shaft (not shown) which may be of the construction usually used in operating speed indicators and which leads to some rotating part of the machine with which the device is used. The inner end of this shaft section 25 is provided with a crank pin 26 situated eccentrically of the shaft 25. This crank pin fits into a semi-circular recess 27 in a bearing block 28 which is secured to an ear 32 formed on one arm of an elbow lever 29 that is pivoted to the casing at 30. This elbow lever 29 is acted on by a spring 31 which holds the bearing block 28 in engagement with the crank pin 26 and said bearing block is pivoted on a stud 33 carried by the ear 32. The other arm of the elbow lever 29 has pivotally connected thereto two spring-pressed pawls 34, 35 which engage ratchet teeth formed on the driving member 6.

With this arrangement the rotation of the shaft section 25 and its crank pin 26 will, in conjunction with the spring 31, cause a vibrating movement of the elbow lever 29 and this movement is converted into a rotary movement of the driving member 6 by means of the pawls 34, 35. The swivel or pivoted connection between the block 28 and the ear 32 allows said block to follow the rotary movement of the crank pin 26 as the elbow lever 29 is oscillated.

Figure 7:
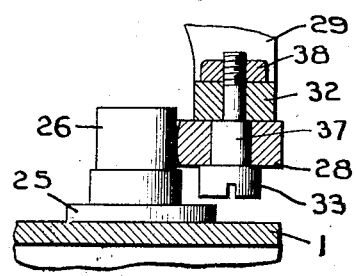
Fig. 7 is an enlarged sectional view on the line 7—7, Fig. 3.

Owing to the rocking motion of the bell crank lever 29 the wall of the recess 27 will have a rocking motion on the crank pin and accordingly I propose to make the wall of the recess slightly convex in a vertical direction as shown clearly in Fig. 7. The stud 33 is provided with an eccentric portion 37 on which the block or shoe 28 is pivoted.

The purpose of this is to provide means for adjusting the block to compensate for wear or to position the block properly with reference to the crank pin. This adjustment is secured by loosening the clamping nut 38 by which the stud is locked in position and then turning the stud slightly, the eccentric portion 37 of the stud causing an adjustment of the block or shoe as the stud is turned.

The above construction is extremely simple but is accurate and effective in operation.

While I have illustrated herein a selected embodiment of my invention I do not wish to be limited to the constructional features shown.

I claim.

1. In an indicating device, the combination with a swinging extensible indicating arm of an index member carried by the arm at the end thereof a dial member having a graduated portion extending in a straight line, and means to extend and contract said arm as it swings thereby to cause the index member to travel in a straight line parallel to the line of graduations of the dial member.

2. In an indicating device, the combination with a swinging arm made in two sections slidable relative to each other, whereby the arm can be extended or contracted, of an index member carried at the end of the extensible section, a dial member having a graduated portion which extends in a straight line, a guiding member having a curved guiding slot, and a projection extending from the slidable section of the arm and operating in said slot, the curvature of the slot being such as to cause the indicating member to move in a straight line parallel to the graduations on the dial as the arm swings.

3. In an indicating device, the combination with a swinging extensible indicating arm, of an index member carried by the end of said arm, a dial member having a graduated portion extending in a straight line, a guiding member having a curved guiding slot, and a pin extending from the extensible portion of the arm and operating in said slot, whereby upon swinging movement of said arm the index member will move in a straight line parallel to the graduations on the dial.

4. In an indicating device, the combination with a swinging extensible indicating arm of an index member on the extensible portion of said arm a dial member having a straight-line graduated portion, means to cause the arm to contract as it swings toward a central position and to expand as it swings away from the central position whereby the index member is given a straight-line movement parallel to the graduated portion of the dial.

5. In an indicator, the combination with a casing having indicator-operating mechanism therein and a sight opening, of a glass covering the sight opening, a dial member situated immediately behind the glass and close thereto, said dial member having a less area than the glass, whereby only a portion of the glass is covered by said member, said dial member also having a straight edge provided with graduations therealong, an index member actuated by the indicator-operating mechanism and movable close to and behind the uncovered portion of the glass and along said straight edge of the dial member, and a screen member situated back of the dial member and between the uncovered portion of the glass and the indicator-operating mechanism, whereby only the dial, the indicator and the screen are visible through the sight opening.

6. In an indicator, the combination with a casing having indicator-operating mechanism therein and an elongated sight opening, of a glass covering the sight opening, a dial member situated immediately behind the glass, said dial member being narrower than the glass, and extending from one edge thereof part way to the opposite edge, the exposed edge of the dial member being straight and having graduations therealong, a screen member situated behind the dial member, and an index member situated behind the screen member and the glass and moving close to the latter and along the straight edge of the dial member said screen projecting beyond the graduated edge of the dial member and screening the interior of the casing from view through the portion of the glass not covered by the dial member.

In testimony whereof, I have signed my name to this specification.

GEORGE H. LANG.